Patented May 8, 1951

2,552,706

UNITED STATES PATENT OFFICE 2,552,706

EMULSIFYING AGENT, METHOD OF MAKING SAID EMULSIFYING AGENT, AND WATER-IN-OIL EMULSION USING SAID EMULSIFYING AGENT

Simon Hendrik Bertram, The Hague, Netherlands, assignor to Fredrik Andre Moller, Haren, Netherlands No Drawing. Application March 5, 1947, Serial No. 732,662. In the Netherlands March 8, 1946

37 Claims. (Cl. 252—312)

While the production of stable emulsions of the oil-in-water type presents practically no difficulties at the present day, this cannot be said of emulsions of the reverse type. The best-known emulsifying agents for the production of the latter type of emulsions are products obtained from oils, fats and fatty acids having a high molecular weight. Such an emulsifying agent can be manufactured by subjecting an oil containing linoleic acid or linolenic to such a degree of polymerisation, by heating while removing the decomposition products, that the gelatinous product is still just soluble in untreated oil and dissolving the product thus obtained in untreated oil. The oil containing linoleic acid or linolenic acid is also preferably oxidised. For the production of plastic dispersions of water or aqueous liquids in edible fats or mixtures containing fats and oils with a melting point above 10° C., there are used dispersing agents which consist at least partially of esters or condensation or polymerisation products of polyhydric alcohols having at least 8 carbon atoms in the molecule, and containing at least one free alcoholic hydroxyl group in the alcoholic constituent.

It is also known to use as an emulsifying agent for the manufacture of margarine inter alia a product which is obtained by heating refined soya bean oil to 250° C., while stirrring and blowing, until the oil begins to gelatinise; the gelatinised oil is cooled to approximately 100° C., after which it is dissolved in fresh oil at 100°–120° C. It is further known to manufacture such agents from oils containing linoleic or linolenic acid. In the manufacture of margarine, so-called anti-sweating and anti-spattering agents are used. Anti-spattering agents are substances in which the hydrophile and lipophile groups are practically "balanced"; examples of these are calcium triricinolein phosphite, the sodium salt of stearyl glycollic acid, monostearyl glucose and monostearyl mannitol. The anti-sweating agents consist of acyl or alkyl derivatives of polyhydroxy compounds, in which the acyl or alkyl groups contain at least six carbon atoms and are joined through oxygen to the polyhydroxy compound, in which latter there remain one or more free hydroxyl groups, except in the case of glycerol derivatives, in which there must remain two free hydroxyl groups; the hydrophile character of the group derived from the polyhydroxy compound should be insufficient to "balance" the lipophile character of the acyl or alkyl groups. Examples are: monopalmitic, monostearic and monoleic acid esters of glycerol. It has also been proposed to use for the production of water-in-oil emulsions, condensation products of higher fatty acids and polysaccharides, preferably dissolved colloidally or molecularly in the organic substance constituting the external phase of the emulsion; examples of the fatty acids are: stearic acid, palmitic acid, oleic acid, linoleic acid, linolenic acid.

Emulsifying agents of these kinds have become highly popular. For practical purposes they are produced from drying oils (so-called Palsgaard oils) and consequently impart a more or less distinct taste or smell of linseed oil, which is not desirable in edible oils and fats. Furthermore, their manufacture generally requires such a high temperature that thermal decomposition products are produced, which adversely affect the colour, taste and smell of the product.

On the other hand, there are known high molecular products containing in their molecules the residues of a polyhydric alcohol, a polybasic organic acid and a monobasic organic acid (fatty acid). They are generally referred to as resins or resinous products, part of them being insoluble and part soluble in organic solvents or fatty oils. These products have widely diverse uses, for example as binding agents for grindstones, as softening agents in lacquers, as coating agents, particularly in combination with cellulose esters, in the manufacture of "grease-proof" paper (in dispersion), as a binding agent for dyes etc. As the polybasic acid, phthalic acid or its anhydride is mostly used; however, in the literature other polybasic organic acids are also mentioned, such as maleic acid (or its anhydride), sebacic acid, etc., if desired, in conjunction with boric acid. The fatty acid is practically always of the drying type or castor oil fatty type, but non-drying fatty acids are also mentioned. The products as a rule are produced by allowing the components to react; occasionally, however, the starting materials are oils (mostly drying oils or castor oil, but sometimes non-drying oils) which are heated with the polybasic acid and, if necessary also with the polyhydric alcohol, see Carleton Ellis, The Chemistry of Synthetic Resins, New York, 1935, vol. II, pages 909 and foll. Three processes may be mentioned here more specifically. In the first of these a non-drying glyceride oil, such as blown castor oil, cocoanut oil or palm kernel oil, is caused to react with a polyhydric alcohol and with a polybasic acid, such as sebacic or phthalic acid; the products are soluble in several organic solvents and are used in lacquers together with nitrocellulose. In the second of these processes a drying oil is produced by heating above 200° C. castor oil, or a similar non-drying oil having as a basis a fatty acid containing a hydroxyl group, with the anhydride of a polybasic acid above 200° C. For this purpose more than 1 molecule of the anhydride is used for 2 molecules of the fatty acid of the oil. In the third process a polybasic acid or its anhydride, a polyhydric alcohol, soya bean oil and fatty acids of soya bean oil (the latter to raise the gelatinisation point above 246° C.) are allowed to react above 200° C., so that the oil is incorporated in the resin before gelatinisation occurs. The products are used among other things for coating materials.

As a rule the products described in the preceding paragraph are polymerised or condensed as completely as possible, and none of these products is suitable as an emulsifying agent. For this reason it has been proposed to sulphonate an oleic acid-glycollic-phthalic acid resin in order to render it soluble in water, so that it can serve as an auxiliary agent in the production of water-in-oil emulsions.

The present invention is based on the observation that excellent emulsions of the water-in-oil type are obtained when there is used as the emulsifying agent a product which contains in the molecule the residues of a polyhydric alcohol, a fatty acid and a polybasic organic acid and which, by the application of heat, has been polymerised and/or condensed to such a degree that it has acquired good emulsifying properties. This degree of polymerisation and/or condensation can be determined by making tests on small test portions of the reaction mass which at the same time indicate the development of the emulsifying capacity of the reaction mass, as well as its optimum value. For ascertaining the emulsifying capacity of a substance there exist several methods, for example the so-called "steam emulsion test." This test, which has been extensively described for mineral oils in A. S. T. M. Standards Petroleum Products and Lubricants, September 1937, American Society for Testing Materials, D. 157-36, page 124, enables, for example, the time taken for a certain amount of oil to be separated from a water-in-oil emulsion to be ascertained. It is especially suitable for determining the heat resistance or stability of emulsions of the water-in-oil type. According to the "steam emulsion test," 20 cc. of oil having a small amount of the emulsfying agent in solution are placed in a vertical glass tube and steam is introduced into the oil until the total volume of the emulsion obtained amounts to 40 cc. This takes from 4 to 6.5 minutes. The contents of the tube reach a temperature of 190° to 195° F. in 45 to 75 seconds, and this temperature is maintained. Immediately after the volume of the emulsion has reached 40 cc., the tube is transferred to a water bath at a temperature of 200°–203° F. The contents then are examined at least every 30 seconds, and the volume of the separated layer of oil is recorded each time. For the purpose of this invention, the emulsifying properties are defined as good, when the time, as determined by the "steam emulsion test," necessary for the separation of 5 cc. of oil from the emulsion is at least 5 minutes when there is used 0.25 per cent solution in mineral oil of the emulsifying agent to be examined, and at least 20 minutes when the emulsifying agent has been dissolved in refined ground nut oil. Frequently, however, emulsions of an appreciably greater stability are obtained, in which these times are as much as 2½ hours, and 5½ hours, instead of 5 minutes and 20 minutes respectively. The new emulsifying agents are soluble in oil, but insoluble, or practically insoluble, in water. During the condensation and/or polymerisation reaction occurs between the carboxyl groups of the polybasic acid and the other substances.

Experiments have shown that to obtain the desired emulsifying properties the heating should often be continued until the oil has closely approached its gelatinisation point; as a rule a rather sudden thickening occurs during this heating. In some cases it is still possible to use the just gelatinising or the just gelatinised product, provided it is still soluble in fatty oil; otherwise the product will not satisfy the requirement of possessing good emulsifying properties. However, the mixtures do not always possess the capacity for gelatising on prolonged heating, and this capacity frequently requires the presence of a minimum amount of the polybasic acid, which can be determined by tests. Whether the mixtures gelatinise or not also depends on the kind of fatty acids or fats or oils that are used. Good emulsifying agents have also been provided by products which do not gelatinise on prolonged heating and which are still soluble in fatty oil.

To produce the mulsifying agents of the invention, the various components can be heated together for such a time that the requirement defined above has been complied with. It has been found to be preferable, however, to start from a partial or complete ester of a polyhydric alcohol and a fatty acid or from a mixture of such substances and to esterify or partially re-esterify respectively this material with a polybasic acid, while continuing to heat for such a time that the product obtained has acquired good emulsifying properties. In all cases the production of the new emulsifying agents is distinguished from that of the so-called modified Glyptal or alkyd resins inasmuch as in the process of the invention the heating is continued to, but not beyond, the point described above. This is not the case in the production of the known resins, since other requirements are specified for them, such as film-forming capacity. Another important difference is further shown by the fact that, although possible, it is neither necessary, nor desirable in the present case to use unsaturated fatty acids or unsaturated hydroxy fatty acids, whereas this is actually customary with the above-mentioned known resins and is even necessary, as practice has shown, in the case of the known emulsifying agents produced by the polymerisation of fatty oils. The reaction product can be dissolved by warming or heating it with an untreated oil, which need not be the same as the oil used as starting material. The product dissolves better when oil is added to the reaction product at an increased temperature in which case even a just gelatinising or a just gelatinised product can frequently be successfully dissolved.

The emulsifying agents produced by the invention can be used for the emulsification of water in all kinds of oil, including mineral oil; they find for this reason a great variety of technical applications. By way of example there may be mentioned cosmetics, textile auxiliary agents, the leather industry, substitutes for lecithin and pharmacology. Of particular importance, however, are products obtained from components belonging to or at least to some extent allied to the class of edible oils and fats, since, when the polybasic acid is correctly chosen, such products are edible. The emulsions produced with these edible emulsifying agents can, for example, be used, with excellent results as plate-oil emulsions in the baking of bread. The edible emulsifying agents are also highly suitable for the manufacture of margarine, shortenings, mayonnaise, etc. The final products obtained are good emulsions, which are highly resistant to heat and do not spatter when heated.

The remarkable properties of the emulsifying agents obtained according to this invention are probably attributable to their possession of a tridimensional macromolecular structure.

Among the polybasic organic acids used in the invention polybasic aliphatic carboxylic acids or anhydrides thereof are specially useful, particularly with a view to their use in edible oils and fats; their usefulness, however, varies to a certain extent with their structure. Too many hydroxyl groups in the molecule renders the solubility in water of the final product too great. According to this general rule acids like tartaric acid and citric acid, though they can be used, are less suitable unless their hydroxyl groups are rendered ineffective by blocking them with hydrophobic radicals, which, however, complicates the manufacture. Malic acid is a hydroxy carboxylic acid, which, when heated, easily loses its hydroxyl group by splitting off water; it is therefore more suitable. Exceptionally suitable, as experiments have shown, are dibasic aliphatic carboxylic acids, such as maleic acid, fumaric acid and sebacic acid, which on account of their harmlessness to the human body, are very suitable for making emulsifying agents for the emulsification of water in edible oils and fats. The acids must naturally satisfy the requirement that before reacting they do not lose their properties as polybasic acids, with the exception of the formation of an hydride; neither should they be too volatile. They should further dissolve in the oil under the reaction conditions.

As polyhydric alcohols a great variety of alcohols can be used, for example, glycol, and especially glycerol. Triglycerides are preferably used as starting materials, as with them the manufacture is simplest and gives the most reliable results. The molecule may contain the residue of one or several fatty acids.

The nature and the relative amounts of the components substantially determine the period of heating. Experiments have shown that generally speaking it is advantageous to use 1 molecule of the dibasic acid or slightly more for each molecule of the normal fatty acid ester, for example the triglyceride. If appreciably more is used the reaction will frequently proceed very quickly, so that gelatinisation occurs very soon; if appreciably less is used, the reaction will proceed very slowly, while frequently no gelatinisation occurs on continued heating.

The products manufactured in the manner described above still have a relatively high content of free acid. If, for practical purposes, this is undesirable, for example with a view to the technical properties of the product, the free acid can be wholly or partially neutralised with substances having an alkaline reaction, such as triethanolamine. The emulsifying capacity as a rule undergoes but little change in consequence of such neutralisation. The products keep their solubility in oils, some of them becoming slightly "soluble" in water with the formation of an opalescent liquid; they do not, however, acquire the character of capillary active substances, their molecular weight being too high.

A considerable improvement in the reaction product and an appreciable shortening of the heating period is achieved if after the condensation with the dibasic acid or its anhydride has been in progress for some time, glycerol is added, and the heating is then continued. The glycerol probably reacts with an initial condensation product of the fatty acid ester and the polybasic acid, and this reaction seems to be more rapid than the continued condensation of the original substances; this explanation, however, is not certain. A further advantage, for example, in connection with the taste and the technical properties of the product is that in this case also the product contains a smaller amount of free acid. Finally, the product contains proportionally less of the comparatively expensive polybasic acid. The amount of glycerol to be added may be varied within wide limits; experience has shown it to be sufficient to add enough glycerol to enable the free acid content of the final product to fall below 5 per cent, calculated as oleic acid. Instead of glycerol other polyhydric alcohols such as polyglycerol, glycol, polyglycols, mannitol and the like can be used. It is also possible to use a combination of the expedients described in this and the preceding paragraph. For the re-esterification or esterification described above, known catalysts can be used.

Drying oils or oils containing a hydroxyl group in the molecule as a rule react comparatively quickly with the polybasic acid or its anhydride, especially with maleic anhydride. The addition of a polyhydric alcohol in the course of the reaction is therefore of greater practical importance if the oil or fat used is not of the drying type and the acid on which it is based does not contain a hydroxyl group.

The temperature at which the starting materials are heated together, naturally depends on their nature. Generally it is not necessary for the temperature to be above 250° C. Preferably the mixture is first heated for some time, for example a couple of hours, at approximately 200° C., whereupon the temperature is slowly increased, for example to approximately 240° C. When, after some time, a polyhydric alcohol is added, as described above, it is recommended to let the temperature decrease beforehand, for example to approximately 150–180° C. The materials should in any case be heated for such a time and at such a temperature that the products obtained satisfy the requirements herein defined for a good emulsifying agent.

As already stated, the products of the invention possess a considerable emulsifying capacity for water in oil. This is particularly the case with the products produced from fatty oils or fats and containing as a polybasic organic acid an aliphatic polycarboxylic acid without hydroxyl groups. For most reaction mixtures entering into consideration for practical purposes, the temperature at which the reaction takes place need not be as high as that used in practice for the so-called Palsgaard oils, while "blowing" is not necessary either, the result being that the colour, taste and smell of the products of the invention can be improved as compared with those of the last-named oils. Another advantage is that for the manufacture of the products of the invention no drying oils need be used, so that the final products lack the typical taste and smell of linseed oil peculiar to the known emulsifying agents based on fatty oils, while they are also less liable to oxidation. Particularly suitable starting materials are the elaidinised and hydrogenised oils and fats. It is, however, also possible to use soya bean oil, particularly for the production of edible emulsions.

Experiments have shown it to be advantageous to dissolve the reaction product in the desired oil, as this can be done better during the production of the emulsifying agent than by the user. This intermediate product, which is stable, can be put on the market. The amount of water necessary for practical purposes can easily be emulsified in this product, if necessary, after diluting it with oil.

The following examples illustrate the invention:

*Example I*

0.5 to 1.5 parts by weight of a reaction product obtained in the manner described below are mixed, by stirring at a slightly raised temperature, with 99.5 to 98.5 parts by weight respectively of an edible oil or fat. After the addition of water, milk and any other materials which may be desired, for example materials which are customary for the preparation of mayonnaise, margarine, shortenings or plate emulsions, a very stable water-in-oil emulsion is made from the mixture by stirring, churning or homogenisation.

The said reaction product is obtained as follows:

Equimolecular quantities of the monoglyceride of ground nut oil (produced in a known manner by heating ground nut oil with glycerol) and sebacic acid are heated, while stirring, in a current of carbon dioxide at 200° C. After a heating for 4½ hours, a sample of the reaction mixture becomes thicker and tougher, and this tendency is enhanced after 6½ hours. After 7 hours of heating a rather sudden gelatinisation occurs, whereupon an equal weight of fresh ground nut oil is added, whereby the reaction product is dissolved. After 4½ hours of heating the time for the separation of 5 cc. of oil as determined by the "steam emulsion test" is 8 minutes; however, after 7 hours of heating the time is 110 minutes, in both cases if a 0.25 per cent solution of the reaction product in refined ground nut oil is subjected to this test. After cooling a good emulsifying agent is obtained. The free acid content, calculated as sebacic acid, varies during this process as follows:

| | Per cent |
|---|---|
| Unheated mixture | 32.8 |
| After 2 hours of heating | 8.2 |
| After 4½ hours of heating | 4.7 |
| After 6½ hours of heating | 3.8 |
| After 7 hours of heating | 2.8 |

*Example II*

An emulsion of water in oil is produced in the manner described in Example I, using, however, as an emulsifying agent 0.5–1.5 per cent. of a product prepared as follows:

95–113 grams of maleic anhydride are dissolved in 750 grams of ground nut oil. The mixture is heated while stirring for 2 hours at 200° C. in a current of an indifferent gas to prevent oxidation. The temperature is subsequently slowly increased to 230° or 235° C., which temperature is maintained for 2 hours. The temperature is then lowered to approximately 180° C., after which 32 grams of glycerol (specific gravity 1.27) are added, whereupon the temperature is slowly raised again to 230° C. After another 1½ hours of heating at this temperature a product with good emulsifying properties is obtained, and if 113 grams of maleic anhydride have been used, gelatinisation occurs. The emulsifying properties of the product are appreciably less satisfactory if the heating is not continued for so long, while if the heating is too prolonged, products insoluble in oil are obtained. The free acid content determined by titration, has now fallen to 2.5 per cent. calculated as oleic acid (or to 0.5 per cent., calculated as maleic acid). Immediately on completion of the final heating, 450 grams of ground nut oil are added, whereby the product, even if gelatinising, can just be dissolved. After cooling a powerful emulsifying agent, light in colour and without much taste and smell is obtained.

If 95 grams of maleic anhydride or less are used, no gelatinisation will occur, even upon continued heating, the emulsifying properties of the reaction product being less satisfactory than those of the product obtained using more than 95 grams of maleic anhydride.

If the reaction product in a 0.25 per cent. solution is subjected to the "steam emulsion test" the following times for the separation of 5 cc. of oil are obtained:

| | When dissolved in ground nut oil | When dissolved in spindle oil |
|---|---|---|
| Using 113 grams of maleic anhydride: | | |
| ½ hour prior to gelatinisation...min.. | 20 | 6 |
| at the end of the test...........hours.. | 6 | 2½ |
| Using 95 grams of maleic anhydride: | | |
| at the end of the test............min.. | 75 | 20 |

A good product is also obtained if, in the process described in this example, there is used 300 grams of rape oil, 45 grams of maleic anhydride and 12.5 grams of glycerol, the mixture being diluted with 180 grams of fresh rape oil.

What I claim is:

1. An emulsifying agent that produces excellent heat-resistant emulsions of the water-in-oil type, comprising an oil soluble but substantially water insoluble non-resinous reaction product of the heating together in any order of a low molecular polyhydric alcohol, a higher fatty acid and an aliphatic polycarboxylic acid until the interaction thereof has proceeded to a stage at which the reaction product has emulsifying powers such that upon subjecting 20 cc. of a 0.25% solution thereof in neutral, freshly refined ground nut oil to the "steam emulsion test" the time required for separation of 5 cc. of the oil is at least 20 minutes.

2. An emulsifying agent that produces excellent heat-resistant emulsions of the water-in-oil type, comprising a solution in an oil of an oil soluble but substantially water insoluble non-resinous reaction product of the heating together of a low-molecular polyhydric alcohol, a higher fatty acid and an aliphatic polycarboxylic acid until the interaction thereof has proceeded to a stage at which the reaction product has emulsifying powers such that upon subjecting 20 cc. of a 0.25% solution thereof in neutral, freshly refined ground nut oil to the "steam emulsion test" the time required for separation of 5 cc. of the oil is at least 20 minutes.

3. An emulsifying agent that produces excellent heat-resistant emulsions of the water-in-oil type, comprising an oil soluble but substantially water insoluble non-resinous reaction product of the heating together of glycerol, a vegetable oil and a dibasic aliphatic polycarboxylic acid until the interaction thereof has proceeded to a stage at which the reaction product has emulsifying powers such that upon subjecting 20 cc. of a 0.25% solution thereof in neutral, freshly refined ground nut oil to the "steam emulsion test" the time required for separation of 5 cc. of the oil is at least 20 minutes.

4. An emulsifying agent that produces excellent heat-resistant emulsions of the water-in-oil type, comprising an oil soluble but substantially water insoluble non-resinous product of the incomplete interaction under heat of a substance from the group consisting of aliphatic polycarboxylic acids and their anhydrides and an ester of a low-molecular polyhydric alcohol and a higher fatty acid, to a stage at which the reaction product has emulsifying powers such that upon subjecting 20 cc. of a 0.25% solution thereof in neutral, freshly refined ground nut oil to the "steam emulsion test" the time required for separation of 5 cc. of the oil is at least 20 minutes.

5. An emulsifying agent that produces excellent heat-resistant emulsions of the water-in-oil type, comprising an oil soluble but substantially water insoluble non-resinous reaction product of the heating together of an edible glyceride and an edible dibasic aliphatic polycarboxylic acid until the interaction thereof has proceeded to a stage at which the reaction product has emulsifying powers such that upon subjecting 20 cc. of a 0.25% solution thereof in neutral, freshly refined ground nut oil to the "steam emulsion test" the time required for separation of 5 cc. of the oil is at least 20 minutes.

6. An emulsion of the water-in-oil type comprising an aqueous phase emulsified in a solution in an oil phase of an emulsifying agent as described in claim 1, the aqueous phase being discontinuous, the oil being in continuous phase and the emulsion being highly heat-resistant.

7. The process of preparing an emulsifying agent that produces heat-resistant emulsions of the water-in-oil type, which comprises reacting under heat a mixture of compounds of reaction residues of a low-molecular polyhydric alcohol, a higher fatty acid and an aliphatic polycarboxylic acid until the interaction thereof has proceeded to a stage at which the reaction product is oil soluble but substantially water insoluble and non-resinous and has emulsifying powers such that upon subjecting 20 cc. of a 0.25% solution thereof in neutral, freshly refined ground nut oil to the "steam emulsion test" the time required for separation of 5 cc. of the oil is at least 20 minutes.

8. The process of preparing an emulsifying agent that produces heat-resistant emulsions of the water-in-oil type, which comprises reacting in any order a low-molecular polyhydric alcohol, a higher fatty acid and a substance from the group consisting of aliphatic polycarboxylic acids and their anhydrides to obtain a reaction mass and heating said mass until the interaction of its components has proceeded to a stage at which the reaction product is oil soluble but substantially water insoluble and non-resinous and has emulsifying powers such that upon subjecting 20 cc. of a 0.25% solution thereof in neutral, freshly refined ground nut oil to the "steam emulsion test" the time required for separation of 5 cc. of the oil is at least 20 minutes.

9. A process as described in claim 8 in which said polyhydric alcohol and said substance are employed in approximately equi-molecular proportions.

10. A process as described in claim 8, said heating being carried out for a preliminary period at a temperature of approximately 200° C. and thereafter at temperatures slowly increased to approximately 240° C.

11. A process as described in claim 8 in which said polyhydric alcohol is glycerol.

12. A process as described in claim 8 in which said substance is one containing no hydroxyl groups.

13. A process as described in claim 8 in which said substance is an aliphatic dicarboxylic acid.

14. A process as described in claim 8 in which said substance is an anhydride of an aliphatic dicarboxylic acid.

15. A process as described in claim 8 in which said substance is an aliphatic compound yielding the maleic acid residue.

16. A process as described in claim 8 in which said substance is an aliphatic compound yielding the fumaric acid residue.

17. A process as described in claim 8 in which said substance is an aliphatic compound yielding the sebacic acid residue.

18. A process as described in claim 8, and immediately dissolving the reaction product in an oil.

19. The process described in claim 8, and then dissolving the reaction product in a tri-glyceride.

20. The process described in claim 8, and immediately dissolving the reaction product in a mineral oil.

21. The process of preparing an emulsifying agent that produces heat-resistant emulsions of the water-in-oil type, which comprises reacting under heat a mixture of a low-molecular polyhydric alcohol, a higher fatty acid and a substance from the group consisting of aliphatic polycarboxylic acids and their anhydrides until the reaction has proceeded to an incomplete stage at which the product is oil soluble but substantially water insoluble and non-resinous and has emulsifying powers such that upon subjecting 20 cc. of a 0.25% solution of the product in neutral, freshly refined ground nut oil to the "steam emulsion test" the time required for separation of 5 cc. of the oil is at least 20 minutes.

22. The process of preparing an emulsifying agent that produces heat-resistant emulsions of the water-in-oil type, which comprises reacting under heat a mixture of a substance from the group consisting of aliphatic polycarboxylic acids and their anhydrides and an ester of a low-molecular polyhydric alcohol and a higher fatty acid until the reaction has proceeded to an incomplete stage at which the product is oil soluble but substantially water insoluble and non-resinous and has emulsifying powers such that upon subjecting 20 cc. of a 0.25% solution of the product in neutral, freshly refined ground nut oil to the "steam emulsion test" the time required for separation of 5 cc. of the oil is at least 20 minutes.

23. The process of preparing an emulsifying agent that produces heat-resistant emulsions of the water-in-oil type, which comprises reacting under heat a mixture of a substance from the group consisting of aliphatic polycarboxylic acids and their anhydrides and a partial glycerol ester of a higher fatty acid until the reaction has proceeded to an incomplete stage at which the product is oil soluble but substantially water insoluble and non-resinous and has emulsifying powers such that upon subjecting 20 cc. of a 0.25% solution of the product in neutral, freshly refined ground nut oil to the "steam emulsion test" the time required for separation of 5 cc. of the oil is at least 20 minutes.

24. A process as described in claim 23 in which said partial ester is a partial glycerol ester of non-drying oil fatty acids.

25. A process as described in claim 23 in which said partial ester is a partial glycerol ester of soya bean oil fatty acids.

26. A process as described in claim 23 in which said partial ester is a partial glycerol ester of ground nut oil fatty acids.

27. A process of preparing an emulsifying agent that produces heat-resistant emulsions of the water-in-oil type, which comprises reacting under heat a mixture of a substance from the group consisting of aliphatic polycarboxylic acids and their anhydrides and a triglyceride of a higher fatty acid until the reaction has proceeded to an incomplete stage at which the reaction product is oil soluble but substantially water insoluble and non-resinous and has emulsifying powers such that upon subjecting 20 cc. of a 0.25% solution of the product in neutral, freshly refined ground nut oil to the "steam emulsion test" the time required for separation of 5 cc. of the oil is at least 20 minutes.

28. A process as described in claim 27 in which said triglyceride is a non-drying oil.

29. A process as described in claim 27 in which said triglyceride is soya bean oil.

30. A process as described in claim 27 in which said triglyceride is a ground nut oil.

31. The process of preparing an emulsifying agent that produces heat-resistant emulsions of the water-in-oil type, which comprises reacting in any order a low-molecular polyhydric alcohol, a higher fatty acid and a substance from the group consisting of aliphatic polycarboxylic acids and their anhydrides to obtain a reaction mass, heating said mass for a preliminary period to advance the interaction of its components, then adding lower molecular polyhydric alcohol to the mass, and thereafter heating said mass for a further period until the reaction has proceeded to a stage at which the reaction product is oil soluble but substantially water insoluble and non-resinous and has emulsifying powers such that upon subjecting 20 cc. of a 0.25% solution of the product in neutral, freshly refined ground nut oil to the "steam emulsion test" the time required for separation of 5 cc. of the oil is at least 20 minutes.

32. A process as described in claim 31 in which the additional polyhydric alcohol is glycerol.

33. A process as described in claim 31 in which the additional polyhydric alcohol is added in an amount that produces in the final reaction product a free acid content of less than 5%, calculated as oleic acid.

34. An emulsifying agent that produces excellent heat-resistant emulsions of the water-in-oil type, consisting of an oil soluble but water insoluble and non-resinous reaction product of the heating together of a low molecular polyhydric alcohol, a higher fatty acid and an aliphatic non-hydroxyl dicarboxylic acid until the interaction thereof has proceeded to a stage at which the reaction product has emulsifying powers such that upon subjecting 20 cc. of a 0.25% solution thereof in neutral, freshly refined ground nut oil to the "steam emulsion test" for 20 minutes at a temperature of at least 200° F. not more than 5 cc. of the oil will separate.

35. An emulsifying agent that produces excellent heat-resistant emulsions of the water-in-oil type, consisting of an oil soluble but substantially water insoluble non-resinous reaction product of the heating together in any order of glycerol, a higher fatty acid and substance from the group consisting of aliphatic dicarboxylic acids free of hydroxyl groups and malic acid and anhydrides thereof, the reaction residues of glycerol and said substance being present in approximately equi-molecular proportions and said heating having been continued to a stage of reaction at which the reaction product has such emulsifying powers that not more than 5 cc. of oil separates upon subjecting 20 cc. of a 0.25% solution thereof in neutral, freshly refined ground nut oil to the "steam emulsion test" for 20 minutes at a temperature of at least about 200° F.

36. An emulsifying agent comprising a solution in a tri-glyceride of a reaction product as described in claim 35.

37. An emulsion comprising an aqueous phase emulsified in a tri-glyceride by a reaction product as described in claim 35, the tri-glyceride being in continuous phase, the aqueous phase being discontinuous, and the emulsion being highly heat-resistant.

SIMON HENDRIK BERTRAM.

REFERENCES CITED

The following references are of record in the file of this patent:

UNITED STATES PATENTS

| Number | Name | Date |
| --- | --- | --- |
| 1,967,220 | Barrett | July 24, 1934 |
| 1,977,089 | Roberts | Oct. 16, 1934 |
| 2,022,004 | Larson | Nov. 26, 1935 |
| 2,023,976 | Roberts | Dec. 10, 1935 |
| 2,035,520 | Baird | Mar. 31, 1936 |
| 2,063,855 | Rosenblum | Dec. 8, 1936 |
| 2,137,616 | Hunn | Nov. 22, 1938 |
| 2,178,475 | Frick | Oct. 31, 1939 |
| 2,204,009 | Bruson | June 11, 1940 |
| 2,236,516 | Cahn | Apr. 1, 1941 |
| 2,266,591 | Eckey | Dec. 16, 1941 |
| 2,393,874 | Trent | Jan. 29, 1946 |
| 2,418,453 | Auer | Apr. 8, 1947 |